E. F. O'LEARY & A. E. BLOXSOM.
AUTOMOBILE LOCKING DEVICE.
APPLICATION FILED AUG. 7, 1916.
1,291,617.
Patented Jan. 14, 1919.
2 SHEETS—SHEET 1.
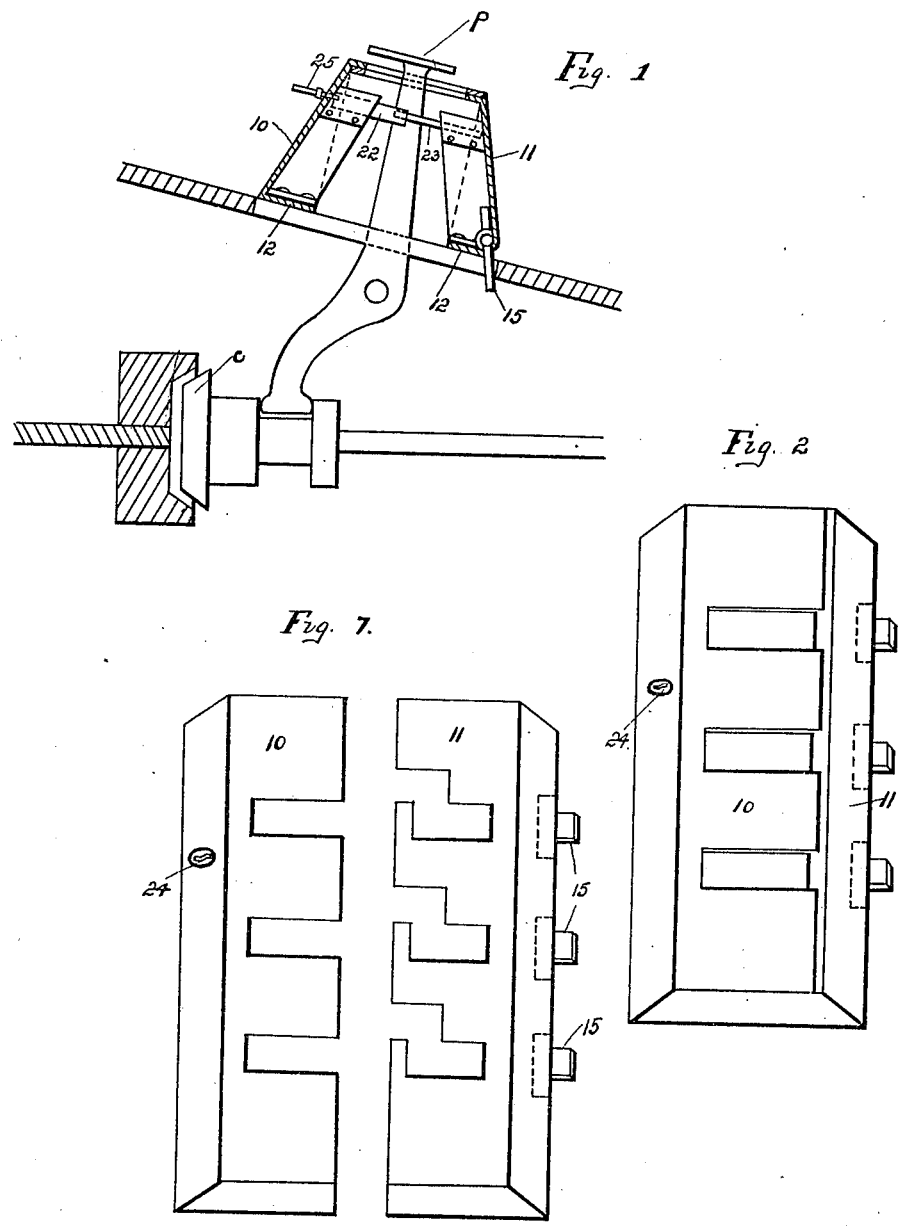

E. F. O'LEARY & A. E. BLOXSOM.
AUTOMOBILE LOCKING DEVICE.
APPLICATION FILED AUG. 7, 1916.
1,291,617.
Patented Jan. 14, 1919.
2 SHEETS—SHEET 2.
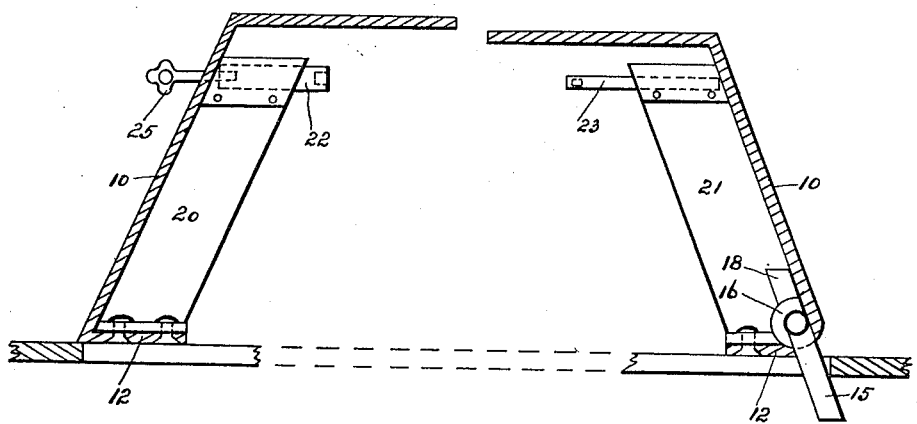
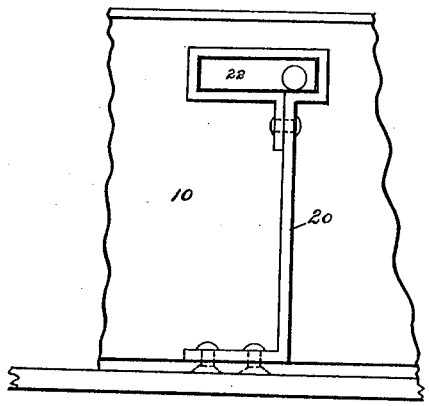
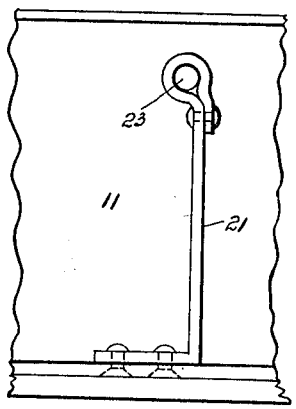
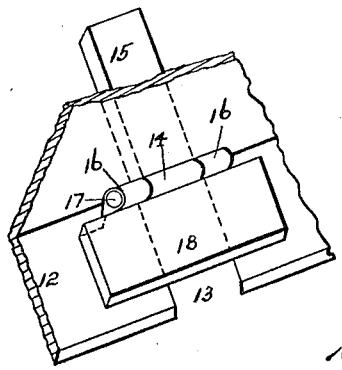

UNITED STATES PATENT OFFICE.

EDWARD F. O'LEARY AND ARTHUR E. BLOXSOM, OF PUEBLO, COLORADO.

AUTOMOBILE-LOCKING DEVICE.

1,291,617.  Specification of Letters Patent.  Patented Jan. 14, 1919.

Application filed August 7, 1916. Serial No. 113,514.

*To all whom it may concern:*

Be it known that we, EDWARD F. O'LEARY and ARTHUR E. BLOXSOM, citizens of the United States, and residents of Pueblo, in the county of Pueblo and State of Colorado, have invented certain new and useful Improvements in Automobile-Locking Devices, of which the following is a full, clear, and exact description.

This invention is an improvement in locking devices for automobiles and its objects are the provision of a device which, when in position, will, through locking the clutch pedal and also, if desired, the brake and gear shift pedals, render starting of the automobile under its own power or controlling the same impossible; which will be of sufficient strength and resistance to tampering by tools as to be practically indestructible; which will have no exposed bolts, rivets or other joining means; which will have its lock proper in an entirely inclosed position so as to be inaccessible; and which will, nevertheless, comply with those police regulations which forbid the locking of an automobile in such manner that it can not be rolled on its own wheels. Further and more particular objects and advantages of our invention will later appear from this specification.

In the two sheets of drawings accompanying this application and forming a part hereof—

Figure 1 is a vertical section through the dash and footboard of an automobile, showing the clutch and clutch pedal in elevation, and our invention in sectional view as applied thereto;

Fig. 2 is a perspective view of the sections of our device in assembled relation, but not in place on a machine;

Fig. 3 is a vertical transverse section on an enlarged scale through our device showing the parts in separated relation;

Fig. 4 is a partial side elevation of the interior of section 10 showing that portion of the locking means carried by this section;

Fig. 5 is a similar view of section 11;

Fig. 6 is a detail in enlarged perspective showing the manner of mounting the stops which are used to hold the device against being pushed out of position; and Fig. 7 is a perspective view showing the two sections of a modified form of our device in separated relation.

As will be evident from an inspection of the drawings, our invention provides a two-part, separable casing adapted to fit over and lock one or more of the control pedals of an automobile so as to render said pedals impossible of being shifted to perform their functions. These casing sections are arranged to telescope one within the other and the means for locking them together are located entirely within the interior of the sections.

Referring first to the modification of our invention shown in Figs. 1 to 6 inclusive, the reference numeral 10 indicates the larger or outer of the telescoping sections and 11 the smaller or inner. The top of each section is notched or slotted from its open side inwardly so as to receive the shanks of the pedals P, as many notches being provided as there are pedals on the machine to which the device is to be applied and the notches on the respective sections being located in opposed relation. Aside from the top portion mentioned each section comprises a side and two end members, the latter telescoping to completely close the ends of the device when in assembled position. Each section has at the bottom an internally turned flange 12 formed by bending the end and side members in, the members being preferably sheared on a diagonal and welded together at the corners. Thus a substantially integral flange 12 is formed which extends entirely around the section at the bottom (excepting the open side thereof); and since it closes only a part of the bottom of each section, it forms what, for the want of a better expression, we have termed a "partial bottom member" in the claims. This partial bottom member constitutes a base for the section and a supporting means for the lock in the form of the invention illustrated. The bottom flange 12 at the side of the section 11 is sheared at several points as shown at 13 and the strips thus cut out are bent back to constitute the eyes 14. To the eyes 14 are pivoted the stop blocks 15. These blocks are T-shaped, as clearly shown in Fig. 6, and are pivoted by ears 16 on pivot pins 17 passing through the eyes 14. The blocks 15 are therefore free to swing through substantially a quarter revolution around the pins 17 but are stopped from turning farther in a clockwise direction than the position indicated in Fig. 3 by the head 18 engaging the side member of the section.

The preferred form of locking means illustrated in the drawings is entirely concealed within the structure and is therefore safe from having any of its essential parts severed by a chisel or saw. We have illustrated the locking means as supported on standards 20, 21 secured by rivets or the like to the flanges 12. The standard 20 carries at its upper end the female portion 22 of the locking means (in this instance shown as an ordinary padlock minus its link) which may be secured in the loop at the top of the standard 20 by any suitable means as by spot welding or the like. The standard 21 carries the male portion 23 of the locking means. These portions may be snapped together when the parts are joined and may be reached for opening by a key 25 inserted through the key hole 24 in the section 10.

In Fig. 7 we have shown a modification of our invention in which the slots in the section 11 are angular instead of entering in a straight line. Otherwise this modification is similar to the form heretofore described.

The manner of use of our device will be apparent from the foregoing description of parts. The section 11 is placed in position with the pedal or pedals received in their proper slots and is slipped forward until the stops 15 fall into the corresponding pedal slots in the foot-board. Then this section is drawn back to the position shown in Fig. 1 where the stops engage the rear ends of the slots. The outer or larger section 10 is then slipped over the section 11, the slots in the section 10 being superimposed over those in 11 and each section serving to close the open ends of the slots in the other. When the parts are home the locking mechanism will catch and the device is securely locked around the pedals. In the type of transmission illustrated the pedal P can not be thrown backward far enough to cause the clutch C to engage because the stops 15 prevent the casing being moved down and any tilting of the casing around the lower edge of the section 11 will bring its upper surface into engagement with the under side of the pedal P. Likewise if the clutch pedal is one which is thrown forward to bring the clutch into engagement, the pedal will at once engage the top of the box and any slight shifting of the box forward which might be had (due to the absence of stops on the front side) will only cause this engagement to be quicker.

In the modification shown in Fig. 7 the section 11 is presented so that the pedals will enter the angular slots as far as they will go and then the section is moved lengthwise until the pedals are in the rear portions of the slots and the stops 15 are in position to drop into the pedal slots. Then the section 10 is placed in position as with the preceding modification. This modification has the advantage that the sections are not capable of being separated by swinging in arcs about their lower edges but that straight line withdrawal of section 10 is required.

The modification where there are three pedals provided for has been chosen for purposes of illustration as being the most general one; but it will be obvious that the form described may be utilized for locking a machine having a less number of pedals— the unused notches being merely idle. Or, if it is considered that locking the clutch pedal alone is ample, that the device may be decreased in size to afford room for the reception and locking of but this one pedal.

While any suitable metal may be employed for the manufacture of our device we prefer to make the sections of steel the outer surface of which has been case hardened. Thus there will be presented a surface which is resistant to the action of saws or other cutting tools and still the inner, untreated part of the metal will retain its elasticity and therefore its resistance to breaking by shock or bending.

It will be evident from the foregoing description that we have provided a device in which all of the locking portions are concealed and thus out of reach of tampering therewith; and that there are no joining means such as bolts, rivets or the like on any exposed portion of the device where they could be severed to open the same. It will also be evident that the invention disclosed is not limited to the precise structure disclosed and which has been described in detail; but that numerous changes and substitutions may be made without departing therefrom. We do not therefore desire to be considered as limited to the structure shown further than is required by the appended claims.

Having thus described our invention, what we claim and desire to secure by Letters Patent is:

1. In a device of the class described, a telescoping, two-part sectional casing, each of said sections comprising end, one side, and top members, said top members having each a slot extending therein from the open side of the section and the slots in the sections being arranged in coöperating relation, and means for securing said sections in joined relation.

2. In a device of the class described, a two-part sectional casing, each of said sections consisting of end, one side, top, and partial bottom members, said top members having each a plurality of slots extending therein from the open side of the section and the slots in the sections being arranged in coöperating relation, and locking means carried by said partial bottom sections for securing said sections in joined relation.

3. In a device of the class described, a two-part sectional casing, each of said sections consisting of end, one side, top, and partial bottom members, said top members having each a plurality of slots extending therein from the open side of the section and the slots in the sections being arranged in coöperating relation, and locking means comprised entirely within said casing and carried by said partial bottom members for securing said sections in joined relation.

4. In a device of the class described, a two-part, telescoping, sectional casing having pedal receiving and retaining slots therein, means for locking said sections in joined relation, and pivoted stops carried by one of said sections, said stops being so shaped and located as to be received in the pedal slots of an automobile and to rigidly engage the adjacent ends thereof.

5. In a device of the class described, a two-part, telescoping, sectional casing having pedal receiving and retaining slots therein, means for locking said sections in joined relation, and a plurality of stops pivoted on the inner side of the lower or rear section, said stops being so shaped and located as to be received in the pedal slots of an automobile and to rigidly engage the rear ends thereof.

6. In a device of the class described, a two-part sectional casing, each of said sections consisting of end, one side, top, and partial bottom members, said top members having each a plurality of slots extending therein from the open side of the section and the slots in the sections being arranged in coöperating relation, a standard mounted on the partial bottom member of each section, and coöperating locking devices carried by said standards.

In testimony whereof we have hereunto affixed our signatures.

EDWARD F. O'LEARY.
ARTHUR E. BLOXSOM.

Copies of this patent may be obtained for five cents each, by addressing the "Commissioner of Patents, Washington, D. C."